(12) United States Patent
Athas

(10) Patent No.: US 7,689,846 B1
(45) Date of Patent: \*Mar. 30, 2010

(54) METHOD AND APPARATUS FOR INCREASING THE OPERATING FREQUENCY OF AN ELECTRONIC CIRCUIT

(75) Inventor: William C. Athas, San Jose, CA (US)

(73) Assignee: Apple Inc., Cupertino, CA (US)

( \* ) Notice: Subject to any disclaimer, the term of this patent is extended or adjusted under 35 U.S.C. 154(b) by 384 days.

This patent is subject to a terminal disclaimer.

(21) Appl. No.: 11/179,695

(22) Filed: Jul. 11, 2005

Related U.S. Application Data

(63) Continuation of application No. 10/975,520, filed on Oct. 27, 2004, now Pat. No. 6,966,008, which is a continuation of application No. 09/991,092, filed on Nov. 16, 2001, now Pat. No. 6,813,719.

(51) Int. Cl.
*G06F 1/04* (2006.01)
*G06F 1/08* (2006.01)
*G06F 1/10* (2006.01)

(52) U.S. Cl. .................. 713/322; 713/300; 713/310; 713/320; 713/321; 713/323; 713/600

(58) Field of Classification Search .............. 713/100, 713/300, 310, 320–323, 600
See application file for complete search history.

(56) References Cited

U.S. PATENT DOCUMENTS

| | | | |
|---|---|---|---|
| 5,642,388 A * | 6/1997 | Evoy | 375/376 |
| 5,940,786 A | 8/1999 | Steeby | 702/132 |
| 6,091,255 A | 7/2000 | Godfrey | 324/760 |
| 6,230,279 B1 * | 5/2001 | Dewa et al. | 713/324 |
| 6,347,254 B1 | 2/2002 | Lu | 700/29 |
| 6,442,700 B1 * | 8/2002 | Cooper | 713/320 |
| 6,966,008 B2 * | 11/2005 | Athas | 713/320 |
| 6,985,581 B1 * | 1/2006 | Callum | 380/2 |
| 7,171,570 B2 * | 1/2007 | Cox et al. | 713/300 |
| 7,340,622 B2 * | 3/2008 | Cox et al. | 713/300 |

\* cited by examiner

*Primary Examiner*—Thomas Lee
*Assistant Examiner*—Fahmida Rahman
(74) *Attorney, Agent, or Firm*—Park, Vaughan & Fleming LLP

(57) ABSTRACT

One embodiment of the present invention provides a system that facilitates temporarily increasing the operating frequency of an electronic circuit, such as a computer system, beyond a maximum sustainable operating frequency. Upon receiving a request to operate at a higher frequency, the system determines the thermal energy level of a cooling system for the circuit. If the thermal energy level is below a threshold level for the thermal capacity of the cooling system, the system increases the operating frequency of the circuit to a frequency that is greater than the maximum sustainable operating frequency for a period of limited duration. This period of limited duration is short enough to ensure that a temperature increase, caused by increasing the operating frequency, does not raise the operating temperature of the circuit above a maximum operating temperature.

18 Claims, 3 Drawing Sheets

METHOD AND APPARATUS FOR INCREASING THE OPERATING FREQUENCY OF AN ELECTRONIC CIRCUIT

RELATED APPLICATION

This application is a continuation of, and hereby claims priority under 35 U.S.C. §120 to a pending U.S. patent application entitled, "Method and Apparatus for Increasing the Operating Frequency of an Electronic Circuit," by Inventor William C. Athas, Ser. No. 10/975,520, filed 27 Oct. 2004 now U.S. Pat. No. 6,966,008, which is a continuation of application Ser. No. 09/991,092, filed 16 Nov. 2001 (now U.S. Pat. No. 6,813,719).

BACKGROUND

1. Field of the Invention

The present invention relates to the design of electronic circuits. More specifically, the present invention relates to a method and apparatus for temporarily increasing the operating frequency of an electronic circuit beyond a maximum sustainable operating frequency.

2. Related Art

As computer system performance continues to increase at an exponential rate, circuitry within the computer systems must keep pace with ever-faster frequencies. These faster frequencies cause the circuitry to switch more often, which causes the circuitry to consume more power. As the circuitry consumes more power it produces more heat.

This heat must somehow be removed so that the temperature within the computer circuits does not exceed a maximum operating temperature. To this end, computer systems typically include a number of heat-dissipating components, such as heat sinks, cooling fans and heat pipes to dissipate thermal energy.

Unfortunately, providing these heat-dissipating components within a computer system can present a number of problems. First, these heat-dissipating components can significantly increase the volume and weight of a computer system, which is especially a problem for portable computer systems in which volume and weight must be minimized. Second, providing these heat-dissipating components can significantly increase the manufacturing cost of a computer system. Third, providing these heat-dissipating components can reduce reliability of a computer system, because components such as cooling fans, can fail. Furthermore, some of these components such as cooling fans, consume extra power and can thereby decrease battery life in a portable computer system.

In order to reduce the power consumption, many portable computer systems enter a power conservation mode whenever the computer system is not busy. During this power conservation mode, the computer system operates at a reduced frequency and voltage level to minimize the amount of power consumed by the computer system, and to thereby increase battery life. When the computer system becomes busy again, the frequency is increased to a maximum sustainable frequency. For many portable computer systems, this maximum sustainable frequency is determined by the capacity of the computer system to dissipate heat.

Note that this maximum sustainable frequency is determined by assuming that the computer system will operate continuously at this frequency. Most computer applications, however, do not perform computational work continuously. In fact, most applications tend to perform computational work for short, concentrated bursts between long idle periods when the computer system is waiting for user input. Hence, the maximum sustainable operating frequency is typically too conservative because it is based on the worst-case assumption that an application performs computational work continuously.

What is needed is a method and an apparatus for temporarily increasing the operating frequency of a computer system beyond the maximum sustainable operating frequency.

SUMMARY

One embodiment of the present invention provides a system that facilitates temporarily increasing the operating frequency of an electronic circuit, such as a computer system, beyond a maximum sustainable operating frequency. Upon receiving a request to operate at a higher frequency, the system determines the thermal energy level of a cooling system for the circuit. If the thermal energy level is below a threshold level for the thermal capacity of the cooling system, the system increases the operating frequency of the circuit to a frequency that is greater than the maximum sustainable operating frequency for a period of limited duration. This period of limited duration is short enough to ensure that a temperature increase, caused by increasing the operating frequency, does not raise the operating temperature of the circuit above a maximum operating temperature.

In one embodiment of the present invention, the request for the higher operating frequency is received from one of: an application running on the computer system; an operating system of the computer system; or a controller that detects an increase in computational workload by monitoring a current sensor within the computer system.

In one embodiment of the present invention, determining the thermal energy level of the cooling system involves measuring a temperature of a heat sink within the cooling system.

In one embodiment of the present invention, increasing the operating frequency involves increasing the operating frequency for an allotted time.

In one embodiment of the present invention, increasing the operating frequency involves increasing the operating frequency until a command is received to reduce the operating frequency.

In one embodiment of the present invention, if the thermal energy level of the cooling system is not below the threshold value, the system increases the operating frequency to the maximum sustainable operating frequency.

In one embodiment of the present invention, increasing the operating frequency additionally involves increasing an operating voltage of the circuit for the period of limited duration.

In one embodiment of the present invention, after the period of limited duration is over, the system lowers the operating frequency of the circuit to the maximum sustainable operating frequency.

In one embodiment of the present invention, if the circuit is not busy, the system lowers the operating frequency of the circuit to a lower power-conserving frequency, whereby the lower power-conserving frequency further decreases the thermal energy of the cooling system and thereby provides a longer period of boosted frequency when needed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
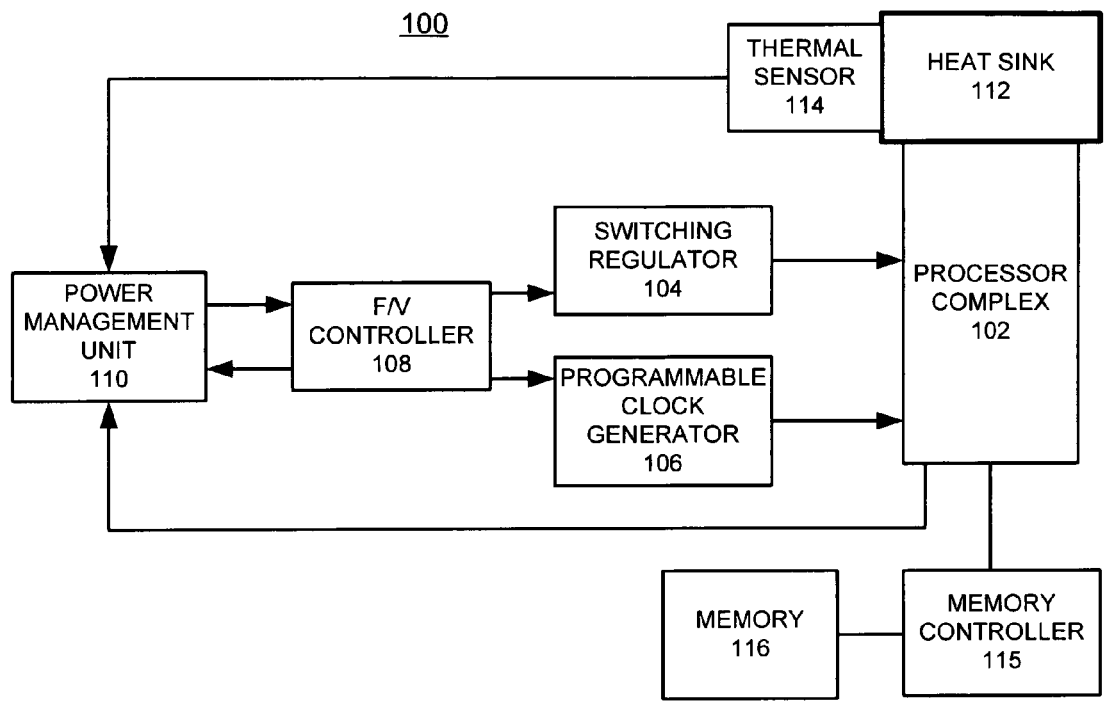
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

Computer system 100 includes a number of components, including one or more processors located within processor complex 102. These processors are coupled to memory 116 through memory controller 115. Processor complex 102 can include one or more computational engines, such as a microprocessor. Memory controller 115 can include any type of circuitry that coordinates accesses to memory 116. Memory 116 can include any type of random access memory for storing code and data to be accessed by processors within processor complex 102.

Computer system 100 also includes a number of components related to controlling power consumption and temperature. These components include heat sink 112, which dissipates heat from processor complex 102. Note that heat sink 112 can additionally dissipate heat from other heat-producing components within computer system 100. Heat sink 112 is coupled to thermal sensor 114, which monitors the temperature of heat sink 112.

The output of thermal sensor 114 is read by power management unit 110. Power management unit 110 generally controls the operating frequency and supply voltage for processor complex 102. It does so by communicating with a special-purpose frequency/voltage controller 108, which sets the DC voltage for a switching regulator 104 and selects the output frequency for a programmable clock frequency generator 106. Switching regulator 104 adjusts the switching frequency or duty cycle delivered to an output LC filter used to regulate supply voltage.

Programmable clock frequency generator 106 can be implemented in a number of ways. One implementation uses multiple phase-lock loops (PLLs). Another implementation uses a single PLL, which includes divided outputs for the different frequencies (e.g., divide-by-two).

Note that some or all of the power management unit 110, frequency/voltage controller 108, switching regulator 104 and programmable clock frequency generator 106 can be alternatively implemented within processor complex 102 through software.

When the processors are not executing computationally intensive tasks, the system operates processor complex 102 at low frequency and voltage settings. Because the cooling system is designed to radiate power assuming worst-case power dissipation, the excess heat removal capacity of the cooling system causes a lower operating temperature when computer system 100 is not busy processing computationally intensive tasks. Note that for many users and applications, the ratio between idle or near-idle time and computationally intensive time is typically quite high.

To execute computationally intensive tasks, processor complex 102 signals power management unit 110 to request more computational speed. Power management unit 110 then adjusts the operating frequency and supply voltage for processor complex 102 based upon the temperature of heat sink 112. Recall that the temperature of heat sink 112 is measured through thermal sensor 114. If heat sink 112 is already hot, the system sets the frequency to a maximum sustainable operating frequency. Otherwise, if heat sink 112 is sufficiently cool, the system configures processor complex 102 to run at a frequency above the maximum sustainable operating frequency until a temperature threshold is reached. The system then reconfigures the processor to operate at the maximum sustainable frequency until processor complex 102 re-enters the power-conserving mode.

Use of a Current Sensor

Figure 2:
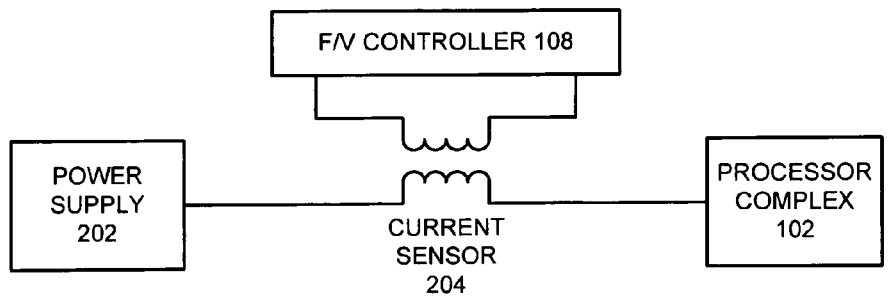
FIG. 2 illustrates the use of a current sensor in accordance with an embodiment of the present invention.

FIG. 2 illustrates the use of a current sensor 204 to determine if processor complex 102 is busy in accordance with an embodiment of the present invention. In this embodiment, frequency/voltage controller 108 receives a signal from current sensor 204, which is coupled between power supply 202 and processor complex 102. When processor complex 102 is performing a computationally intensive task, it draws more power from power supply 202, which causes more current to flow through current sensor 204. This allows frequency/voltage controller 108 to determine that processor complex 102 is performing a computationally intensive task and can use additional computational speed.

Process of Controlling Operating Frequency

Figure 3:
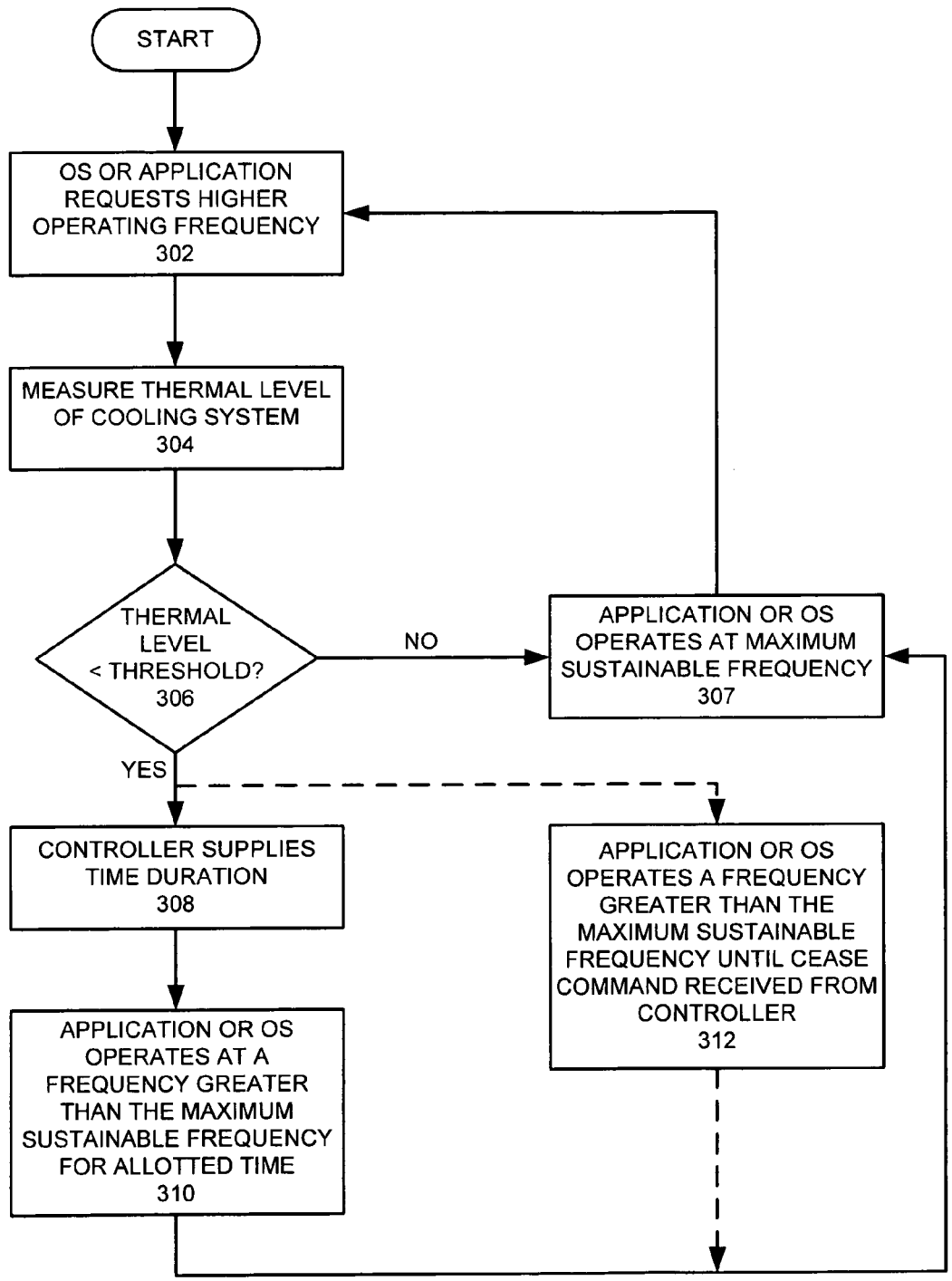
FIG. 3 is a flowchart illustrating the process of controlling an operating frequency for an electronic circuit in accordance with an embodiment of the present invention.

FIG. 3 is a flowchart illustrating the process of controlling an operating frequency for an electronic circuit in accordance with an embodiment of the present invention. The process starts when an operating system or an application requests a higher operating frequency (step 302). Note that the system can alternatively detect a greater computational requirement by monitoring current sensor 204 as is described above with reference to FIG. 2. The system then determines the thermal energy level of the cooling system (step 304). This is accomplished by using thermal sensor 114 to measure the temperature of heat sink 112. Next, the system determines if this thermal energy level is less than a threshold level by determining if the temperature of heat sink 112 is below a threshold value (step 306).

If so, the system is configured to operate for a period of limited duration at a boosted frequency (step 308). The application or operating system then operates at the boosted frequency that is greater than a maximum sustainable frequency (and possibly operates at a higher voltage) for a period of limited duration (step 310). Instead of performing steps 308 and 310, the system can alternatively operate at the higher frequency until a cease command is received (step 312).

After the system is done operating at the boosted frequency (or if the thermal energy level of the cooling system is not below the threshold level at step 306), the application or operating system is run at the maximum sustainable operating frequency (step 307).

Note that when the system becomes less busy, the operating frequency and voltage can be reduced again to power-saving levels, whereby the lower frequency and voltage further decrease the thermal energy of the cooling system and thereby provide a longer period of boosted frequency when needed.

System Performance

Figure 4A:
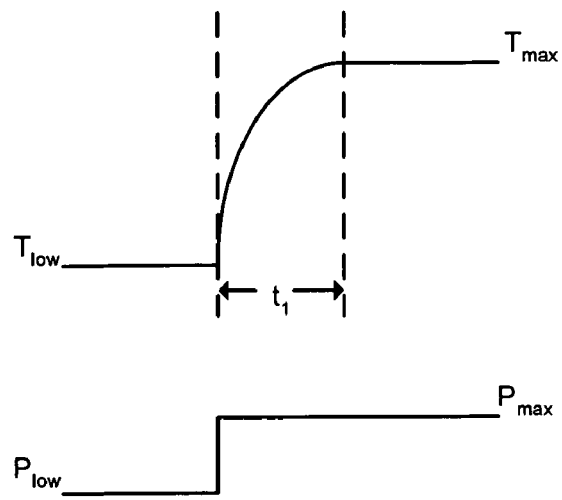
FIG. 4A illustrates performance of a prior art system that controls power consumption.

FIG. 4A illustrates performance of a prior art system that controls power consumption. In this prior art system, the power switches from a low level, $P_{low}$, to a maximum sustainable level, $P_{max}$, when a computationally intensive task is being processed. Note that power consumption of the system is a function of the operating frequency and supply voltage. When the operating frequency and/or the supply voltage increases, power consumption increases. When power consumption increases to $P_{max}$, the temperature of the system gradually reaches a maximum temperature, $T_{max}$, after time, $t_1$.

Figure 4B:
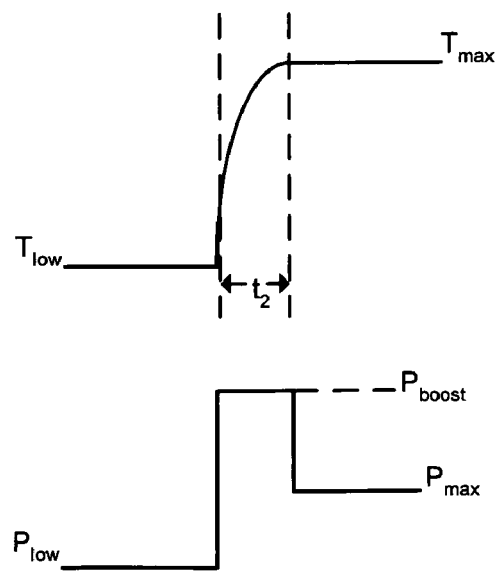
FIG. 4B illustrates performance of the present invention in accordance with an embodiment of the present invention.

FIG. 4B illustrates performance of one embodiment of the present invention. In this embodiment, the power switches from the low level, $P_{low}$, to a boosted level, $P_{boost}$, that is higher than a maximum sustainable power level. The temperature of the system rapidly reaches the maximum temperature, $T_{max}$, in time, $t_2$, which is shorter than time $t_1$. At this point, the power consumption drops to the maximum sustainable level, $P_{max}$.

In an exemplary configuration, one embodiment of the present invention extracts 11% extra performance from a gigahertz microprocessor, and the time duration for boosted operation is 42 seconds for a heat capacity of 407 J/C.

Note that the relationship between temperature and frequency can be expressed as:

$$F_{cool} = F_{hot}\left(\frac{T_{hot}}{T_{cool}}\right)^n, \text{ wherein } n = 1.5. \quad \text{(F1)}$$

This formula is derived from the relationship between temperature and charge-carrier mobility in CMOS field-effect transistors. These temperatures are absolute.

Moreover, the amount of time that the processor can be operated at this boosted frequency is given by the following equation.

$$t = -(R_{CA}C_{HS})\ln\left(1 - \frac{T_J - P_b R_{JC} - T_A}{P_b R_{CA}}\right) \quad \text{(F2)}$$

In this equation, $T_J$ represents the junction temperature, $P_b$ represents power at the boosted frequency, $R_{JC}$ represents thermal impedance from junction to heat sink (or case), $R_{CA}$ represents thermal impedance from case to ambient temperature, and $C_{HS}$ represents the thermal energy capacity of the heat sink.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for increasing an operating frequency of an electronic circuit beyond a maximum sustainable operating frequency, comprising:
    measuring a temperature related to the electronic circuit;
    adjusting the operating frequency of the electronic circuit based on the measured temperature by:
        reading the measured temperature, and if the temperature is below a specified maximum, increasing the operating frequency of the electronic circuit to exceed the maximum sustainable operating frequency, wherein the maximum sustainable operating frequency is the frequency at which the electronic circuit will operate continuously without exceeding its heat dissipation capacity, and if the temperature is not below the specified maximum, setting the operating frequency of the electronic circuit to the maximum sustainable operating frequency.

2. The method of claim 1, wherein the electronic circuit is a computer system.

3. The method of claim 1, wherein measuring the temperature related to the electronic circuit involves measuring a temperature of a heat sink that is thermally coupled to the electronic circuit.

4. The method of claim 1, wherein increasing the operating frequency of the electronic circuit additionally involves increasing an operating voltage of the electronic circuit.

5. The method of claim 1, further comprising lowering the operating frequency of the electronic circuit to the maximum sustainable frequency if the temperature rises above the specified maximum.

6. The method of claim 1, further comprising lowering the operating frequency to a lower power-conserving frequency when a need for the higher operating frequency no longer exists.

7. A computer-readable storage device storing instructions that when executed by a computer cause the computer to perform a method for increasing an operating frequency of an electronic circuit beyond a maximum sustainable operating frequency, the method comprising:
    measuring a temperature related to the electronic circuit;
    adjusting the operating frequency of the electronic circuit based on the measured temperature by:
        reading the measured temperature, and if the temperature is below a specified maximum, increasing the operating frequency of the electronic circuit to exceed the maximum sustainable operating frequency, wherein the maximum sustainable operating frequency is the frequency at which the electronic circuit will operate continuously without exceeding its heat dissipation capacity, and if the temperature is not below the specified maximum, setting the operating frequency of the electronic circuit to the maximum sustainable operating frequency.

8. The computer-readable storage device of claim 7, wherein the electronic circuit is a computer system.

9. The computer-readable storage device of claim 7, wherein measuring the temperature related to the electronic circuit involves measuring a temperature of a heat sink that is thermally coupled to the electronic circuit.

10. The computer-readable storage device of claim 7, wherein increasing the operating frequency of the electronic circuit additionally involves increasing an operating voltage of the electronic circuit.

11. The computer-readable storage device of claim 7, the method further comprising lowering the operating frequency of the electronic circuit to the maximum sustainable frequency if the temperature rises above the specified maximum.

12. The computer-readable storage device of claim 7, the method further comprising lowering the operating frequency to a lower power-conserving frequency when a need for the higher operating frequency no longer exists.

13. An apparatus for increasing an operating frequency of an electronic circuit beyond a maximum sustainable operating frequency, comprising:
 a measuring device comprising a thermal sensor configured to measure a temperature related to the electronic circuit;
 a controlling device comprising a frequency controller configured to adjust the operating frequency of the electronic circuit based on the measured temperature by increasing the operating frequency of the electronic circuit to exceed the maximum sustainable operating frequency if the temperature is below a specified maximum, wherein the maximum sustainable operating frequency is the frequency at which the electronic circuit will operate continuously without exceeding its heat dissipation capacity, and if the temperature is not below the specified maximum, the controlling device is configured to setting the operating frequency of the electronic circuit to the maximum sustainable operating frequency.

14. The apparatus of claim 13, wherein the electronic circuit is a computer system.

15. The apparatus of claim 13, wherein measuring the temperature related to the electronic circuit involves measuring a temperature of a heat sink that is thermally coupled to the electronic circuit.

16. The apparatus of claim 13, wherein increasing the operating frequency of the electronic circuit additionally involves increasing an operating voltage of the electronic circuit.

17. The apparatus of claim 13, further comprising a lowering mechanism configured to lower the operating frequency of the electronic circuit to the maximum sustainable frequency if the temperature rises above the specified maximum.

18. The apparatus of claim 13, further comprising a lowering mechanism configured to lower the operating frequency to a lower power-conserving frequency when a need for the higher operating frequency no longer exists.

* * * * *